(12) United States Patent
Otomura

(10) Patent No.: US 12,282,488 B2
(45) Date of Patent: Apr. 22, 2025

(54) INFORMATION PROCESSING DEVICE, AND INFORMATION PROCESSING METHOD

(71) Applicant: Mitsubishi Electric Corporation, Tokyo (JP)

(72) Inventor: Kotaro Otomura, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 18/395,860

(22) Filed: Dec. 26, 2023

(65) Prior Publication Data

US 2024/0134870 A1 Apr. 25, 2024

Related U.S. Application Data

(63) Continuation of application No. PCT/JP2021/025765, filed on Jul. 8, 2021.

(51) Int. Cl.
*G06F 16/00* (2019.01)
*G06F 16/2458* (2019.01)
*G06F 16/28* (2019.01)

(52) U.S. Cl.
CPC ........ *G06F 16/2462* (2019.01); *G06F 16/288* (2019.01)

(58) Field of Classification Search
None
See application file for complete search history.

(56) References Cited

U.S. PATENT DOCUMENTS

| | | | | |
|---|---|---|---|---|
| 5,265,065 A | * | 11/1993 | Turtle | G06F 16/3335 707/999.005 |
| 6,901,399 B1 | * | 5/2005 | Corston | G06F 16/3344 707/999.005 |
| 2015/0081672 A1 | * | 3/2015 | Wolf | G06F 16/24568 707/722 |
| 2017/0147753 A1 | | 5/2017 | Han et al. | |
| 2018/0060750 A1 | * | 3/2018 | Sheppard | H04H 60/31 |

FOREIGN PATENT DOCUMENTS

| | | |
|---|---|---|
| JP | 2010-117797 A | 5/2010 |
| JP | 2020-80087 A | 5/2020 |
| JP | 2021-68376 A | 4/2021 |

OTHER PUBLICATIONS

German Office Action for German Application No. 11 2021 007 611.6, dated Sep. 27, 2024, with English translation.

* cited by examiner

*Primary Examiner* — Anhtai V Tran
(74) *Attorney, Agent, or Firm* — Birch, Stewart, Kolasch & Birch, LLP

(57) ABSTRACT

An information processing device includes an acquisition control unit that acquires an input value as a numerical value and a feature word as a word related to the input value, acquires probability distribution information as information regarding probability distribution and corresponding to the feature word, and acquires a plurality of target numerical values as a plurality of numerical values corresponding to the feature word and a calculation unit that calculates a plurality of similarity levels each being a level of similarity between the input value and each of the plurality of target numerical values based on the input value, the probability distribution information and the plurality of target numerical values.

6 Claims, 15 Drawing Sheets

FIG. 4

PROBABILITY DISTRIBUTION TABLE 111

| ID | THING | PROPERTY | UNIT | PROBABILITY DISTRIBUTION INFORMATION |
|---|---|---|---|---|
| 0 | — | — | — | normal, $\mu = q$, $\sigma = 1$ |
| 1 | adult male | body height | m | normal, $\mu = 1.7$, $\sigma = 0.3$, unit = m |
| 2 | person | body height | cm | normal, $\mu = 160$, $\sigma = 40$, unit = cm |
| 3 | — | body weight | kg | gamma, $k = 2$, $\theta = 2$, unit = kg |
| ... | ... | ... | ... | ... |

FIG. 6(A)

NUMERICAL VALUE TABLE 112

| ID | BODY HEIGHT (cm) | BODY WEIGHT (kg) |
|---|---|---|
| A1 | 168 | 62 |
| A2 | 175 | 73 |
| A3 | 185 | 88 |
| A4 | 400 | 250 |
| A5 | 5000 | 420 |
| A6 | 2 | 0.2 |

FIG. 6(B)

NUMERICAL VALUE TABLE 112

| ID | SALES FIGURE (yen) | OPERATING PROFIT (yen) |
|---|---|---|
| B1 | 40 BILLION | 2.5 BILLION |
| B2 | 500 BILLION | 4.2 BILLION |
| B3 | 900 BILLION | 8.8 BILLION |

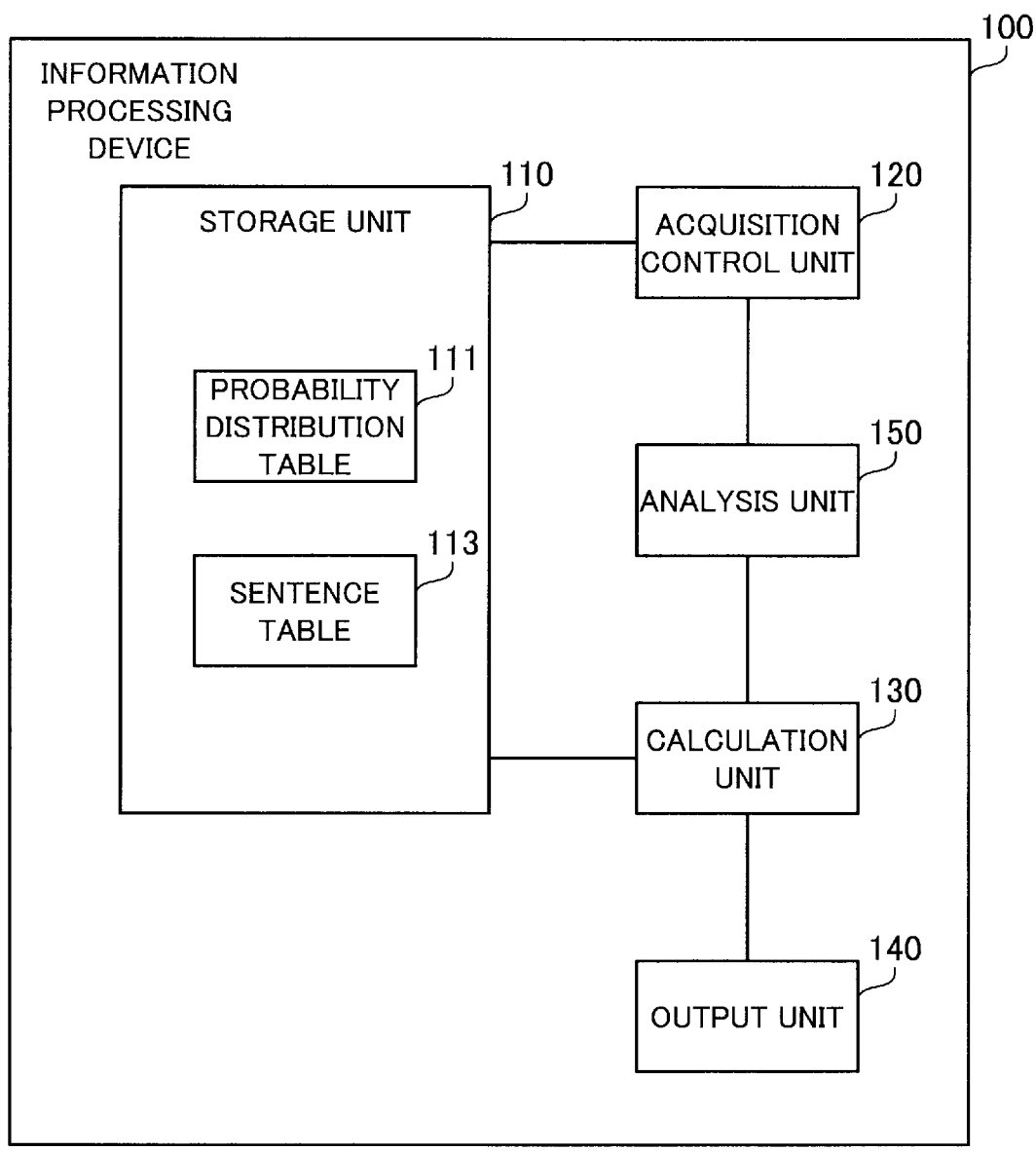

FIG. 12

SENTENCE TABLE

| ID | SENTENCE | NUMERICAL INFORMATION |
|---|---|---|
| C1 | reached adulthood and became as tall as 180 cm | {<br>"THING" : "(unknown)"<br>"PROPERTY" : "(unknown)"<br>"UNIT" : "cm"<br>"NUMERICAL VALUE" : "180"<br>} |
| C2 | an elephant with body weight of 4.2 t strode around and the ground shook | {<br>"THING" : "elephant"<br>"PROPERTY" : "body weight"<br>"UNIT" : "t"<br>"NUMERICAL VALUE" : "4.2"<br>} |
| C3 | the value is well over 20000 | {<br>"THING" : "(unknown)"<br>"PROPERTY" : "(unknown)"<br>"UNIT" : "(unknown)"<br>"NUMERICAL VALUE" : "20000"<br>} |
| C4 | in order to increase body height, it is essential to eat well, exercise well and sleep well | {<br>"THING" : "(unknown)"<br>"PROPERTY" : "(unknown)"<br>"UNIT" : "(unknown)"<br>"NUMERICAL VALUE" : "(unknown)"<br>} |

INFORMATION PROCESSING DEVICE, AND INFORMATION PROCESSING METHOD

CROSS-REFERENCE TO RELATED APPLICATION

This application is a continuation application of International Application No. PCT/JP2021/025765 having an international filing date of Jul. 8, 2021.

BACKGROUND OF THE INVENTION

1. Field of the Invention

The present disclosure relates to an information processing device, and an information processing method.

2. Description of the Related Art

There has been known a technology of searching a database for information including an inputted keyword or information similar to the keyword. This technology is useful. Therefore, the technology is used for the Internet search, for example. In the technology, the search based mainly on a natural language is executed. In the search, when a numerical value is inputted as the keyword, the search is executed based on the numerical value, and thus pieces of information including the numerical value are found by the search.

There are cases where it is desirable to acquire information including a numerical value similar to the inputted numerical value. In such cases of acquiring information including a similar numerical value, it is possible to consider a method using a numerical range including the inputted numerical value. Here, a technology regarding the numerical range has been proposed (see Patent Reference 1).

Patent Reference 1: Japanese Patent Application Publication No. 2020-80087

Incidentally, there are cases where it is desirable to acquire relevant information that is relevant to a character string including a numerical value. For example, it is possible to consider a method of acquiring the relevant information by using a numerical range including the numerical value. However, there is a problem in that it is unclear which ones out of a plurality of pieces of information acquired by the method are the relevant information actually relevant to the character string.

SUMMARY OF THE INVENTION

An object of the present disclosure is to identify the relevant information.

An information processing device according to an aspect of the present disclosure is provided. The information processing device includes an acquisition control unit that acquires an input value as a numerical value and a feature word as a word related to the input value, acquires probability distribution information as information regarding probability distribution and corresponding to the feature word, and acquires a plurality of target numerical values as a plurality of numerical values corresponding to the feature word and a calculation unit that calculates a plurality of similarity levels each being a level of similarity between the input value and each of the plurality of target numerical values based on the input value, the probability distribution information and the plurality of target numerical values.

According to the present disclosure, the relevant information can be identified.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein:

FIG. 4 is a diagram showing an example of a probability distribution table in the first embodiment;

FIGS. 6(A) and 6(B) are diagrams showing examples of a numerical value table in the first embodiment;

FIG. 11 is a block diagram showing functions of an information processing device in a second embodiment;

FIG. 12 is a diagram showing an example of a sentence table in the second embodiment;

DETAILED DESCRIPTION OF THE INVENTION

Embodiments will be described below with reference to the drawings. The following embodiments are just examples and a variety of modifications are possible within the scope of the present disclosure.

First, feature words used in the following description will be explained below. The feature word can be information indicating what a numerical value included in a sentence is about. Further, the feature word can be information indicating a property or an attribute of the numerical value. Furthermore, the feature word can be information indicating a unit or a scale of the numerical value. As above, the feature word is a word related to the numerical value. Specifically, feature words corresponding to a sentence "body height 175 cm of person Z" are "person Z", "body height" and "cm". Incidentally, "person Z" as a feature word can also be "person". Further, the numerical value (e.g., "175") is referred to also as an input value.

FIRST EMBODIMENT

Figure 1:
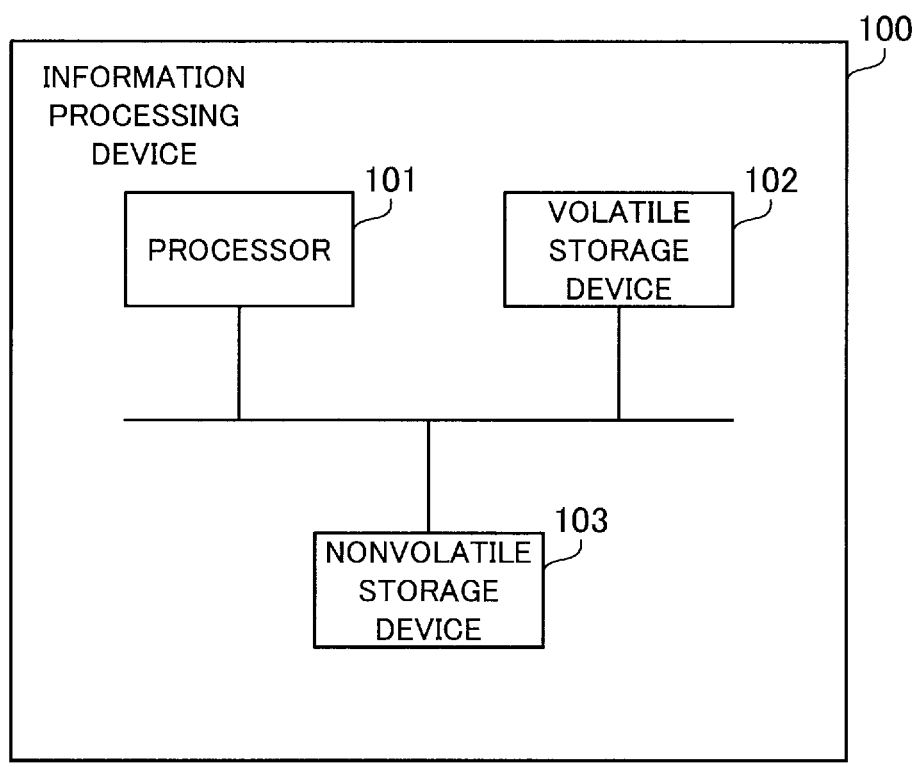
FIG. 1 is a diagram showing hardware included in an information processing device in a first embodiment.

FIG. 1 is a diagram showing hardware included in an information processing device in a first embodiment. The information processing device 100 is a device that executes an information processing method. For example, the information processing device 100 is a client device used by a user, or a cloud server.

The information processing device 100 includes a processor 101, a volatile storage device 102 and a nonvolatile storage device 103.

The processor 101 controls the whole of the information processing device 100. The processor 101 is a Central Processing Unit (CPU), a Field Programmable Gate Array (FPGA) or the like, for example. The processor 101 can also be a multiprocessor. Further, the information processing device 100 may include a processing circuitry. The processing circuitry may be either a single circuit or a combined circuit.

The volatile storage device 102 is main storage of the information processing device 100. The volatile storage device 102 is a Random Access Memory (RAM), for example. The nonvolatile storage device 103 is auxiliary storage of the information processing device 100. The nonvolatile storage device 103 is a Hard Disk Drive (HDD) or a Solid State Drive (SSD), for example.

Next, functions of the information processing device 100 will be described below.

Figure 2:
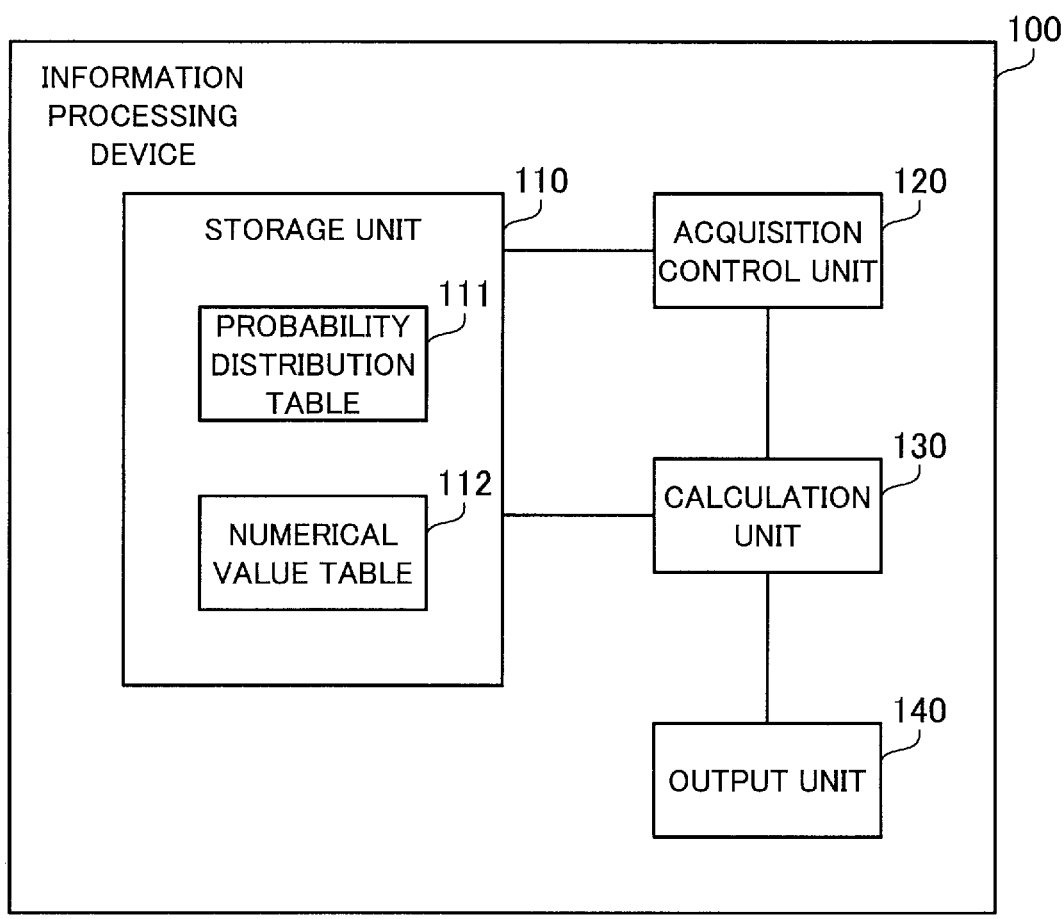
FIG. 2 is a block diagram showing functions of the information processing device in the first embodiment.

FIG. 2 is a block diagram showing the functions of the information processing device in the first embodiment. The information processing device 100 includes a storage unit 110, an acquisition control unit 120, a calculation unit 130 and an output unit 140.

The storage unit 110 may be implemented as a storage area reserved in the volatile storage device 102 or the nonvolatile storage device 103.

Part or all of the acquisition control unit 120, the calculation unit 130 and the output unit 140 may be implemented by a processing circuitry. Further, part or all of the acquisition control unit 120, the calculation unit 130 and the output unit 140 may be implemented as modules of a program executed by the processor 101. For example, the program executed by the processor 101 is referred to also as an information processing program. The information processing program has been recorded in a record medium, for example.

The storage unit 110 may store a probability distribution table 111 and a numerical value table 112. The probability distribution table 111 and the numerical value table 112 will be described later.

The acquisition control unit 120 acquires input data. For example, the input data is a sentence including a numerical value and feature words.

When the input data is a sentence, the acquisition control unit 120 extracts the input value as the numerical value and the feature words from the sentence. For example, the acquisition control unit 120 extracts the input value and the feature words from the sentence by using text mining. Here, an example of a process of extracting the input value and the feature words will be described below.

Figure 3:
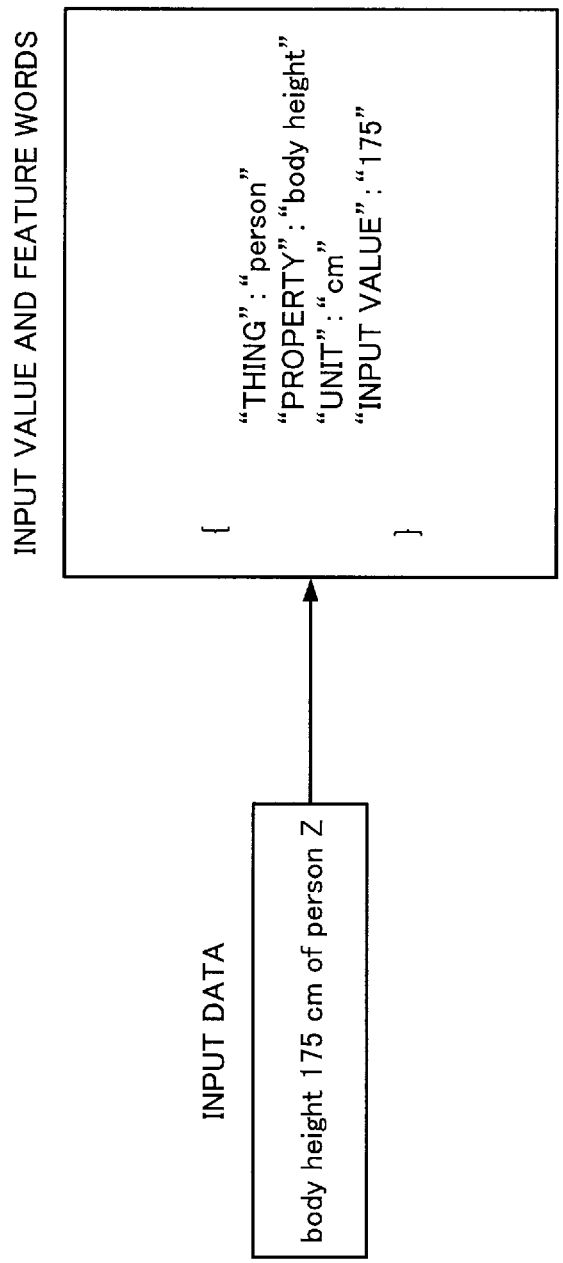
FIG. 3 is a diagram showing a concrete example of a process of extracting an input value and a feature word in the first embodiment.

FIG. 3 is a diagram showing a concrete example of the process of extracting the input value and the feature words in the first embodiment. The input data is "body height 175 cm of person Z". The acquisition control unit 120 extracts the input value and the feature words from the input data. Accordingly, the input value "175" and "person", "body height" and "cm" as the feature words are extracted. The input value and the feature words may also be expressed in JavaScript (registered trademark) Object Notation (JSON).

It is also possible for the acquisition control unit 120 to acquire an input value and feature words. For example, the acquisition control unit 120 may acquire an input value and feature words expressed in JSON. In such cases where an input value and feature words are acquired, the acquisition control unit 120 does not execute the above-described extraction process.

The acquisition control unit 120 acquires probability distribution information corresponding to the feature words. For example, the acquisition control unit 120 acquires the probability distribution information corresponding to the feature words from an external device (e.g., cloud server). Specifically, the acquisition control unit 120 is capable of acquiring the probability distribution information from the external device by transmitting a transmission command regarding the probability distribution information corresponding to the feature words to the external device. Alternatively, for example, the acquisition control unit 120 acquires the probability distribution information corresponding to the feature words from the probability distribution table 111. The case where the probability distribution information is acquired from the probability distribution table 111 will be described below. First, an example of the probability distribution table 111 will be shown below.

FIG. 4 is a diagram showing an example of the probability distribution table in the first embodiment. The probability distribution table 111 may be stored in the storage unit 110. The probability distribution table 111 includes items of identifier (ID), thing, property, unit and probability distribution information. The item of probability distribution information may be referred to also as an item of parameter.

The probability distribution information is information regarding probability distribution. For example, the probability distribution information may be generated based on the numerical value table 112 by using a statistical method such as maximum likelihood estimation. Further, for example, the probability distribution information may be generated based on information not stored in the numerical value table 112. Furthermore, for example, the probability distribution information may be generated based on a mathematical model.

The acquisition control unit 120 acquires the probability distribution information corresponding to the feature words from the probability distribution table 111. An example of an acquisition process of the probability distribution information will be described below.

Figure 5:
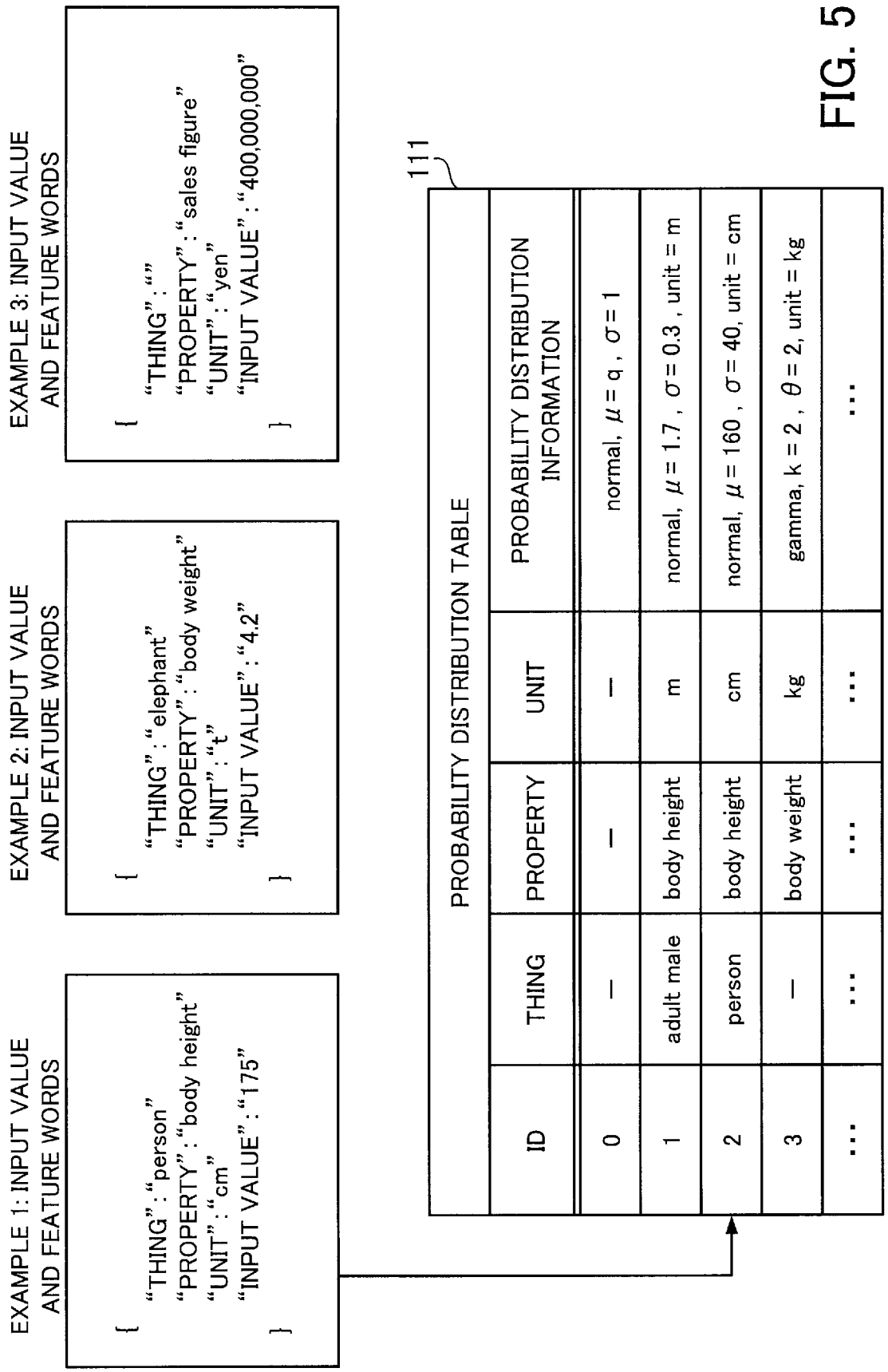
FIG. 5 is a diagram showing an example of an acquisition process of probability distribution information in the first embodiment.

FIG. 5 is a diagram showing an example of the acquisition process of the probability distribution information in the first embodiment. FIG. 5 shows three examples each indicating the input value and the feature words. Cases where the probability distribution information is acquired will be described below by using the three examples.

When the feature words in the example 1 have been acquired, the acquisition control unit 120 executes the following process. The acquisition control unit 120 identifies a record in the probability distribution table 111 that corresponds to "person", "body height" and "cm" as the feature words in the example 1. The identified record is a record with the ID "2". The acquisition control unit 120 acquires the probability distribution information in the record with the ID "2". As above, the acquisition control unit 120 identifies a record totally coinciding with the feature words and acquires the probability distribution information from the identified record. Here, the probability distribution information in the record with the ID "2" will be explained below. The "normal" indicated by the probability distribution information represents normal distribution. Further, "$\mu=160$, $\sigma=40$" indicated by the probability distribution information represents normal distribution with a mean value 160 and a standard deviation 40. As above, the probability distribution information indicates information regarding the probability distribution.

When the feature words in the example 2 have been acquired, the acquisition control unit 120 executes the following process. The feature words in the example 2 are "elephant", "body weight" and "t". The acquisition control unit 120 detects that there is no record totally coinciding with the feature words in the example 2. The acquisition control unit 120 searches for a record that can be considered to be identical with the feature words in the example 2. The acquisition control unit 120 identifies a record with the ID "3" that is a record in which the property coincides and "kg" is similar to "t". The acquisition control unit 120 acquires the probability distribution information from the identified record. As above, when there is no record totally coinciding with the feature words, a record that can be considered to be identical with the feature words is searched for. Further, when there is no record totally coinciding with the feature words, the acquisition control unit 120 may calculate a similarity level between each word in the feature words and each word included in a record. For example, n-grams or distributed representations of words are used for the calculation of the similarity level. The acquisition control unit 120 may identify a record including a word corresponding to a similarity level higher than or equal to a threshold value. Further, the acquisition control unit 120 may identify a record corresponding to the feature words by using synonyms. Furthermore, the acquisition control unit 120 may identify a record corresponding to the feature words by using ontology indicating superordinate concepts and subordinate concepts.

When the feature words in the example 3 have been acquired, the acquisition control unit 120 executes the following process. The feature words in the example 3 are "sales figure" and "yen". The acquisition control unit 120 detects that there is no record totally coinciding with the feature words in the example 3. Further, the acquisition control unit 120 detects that there is no record that can be considered to be identical with the feature words. When there is no record that can be considered to be identical with the feature words (i.e., when probability distribution information corresponding to the feature words cannot be acquired), the acquisition control unit 120 identifies a record with the ID "0" in the probability distribution table 111. The record with the ID "0" is a record that has been set as default. Here, the probability distribution information in the record with the ID "0" will be explained below. The "normal" indicated by the probability distribution information represents normal distribution. Further, "$\mu=q$" indicated by the probability distribution information indicates that the input value "400,000,000" is used as the mean value. Incidentally, the probability distribution information in the record with the ID "0" is referred to also as default probability distribution information. The default probability distribution information is predetermined information and is information regarding the probability distribution.

Further, there are cases where the acquisition control unit 120 transmits the transmission command regarding the probability distribution information corresponding to the feature words to the external device and receives information indicating that there is no probability distribution information corresponding to the feature words from the external device. In other words, these cases are cases where the acquisition control unit 120 cannot acquire the probability distribution information corresponding to the feature words. In such cases, the acquisition control unit 120 may acquire the probability distribution information in the record with the ID "0" from the probability distribution table 111.

As above, when the probability distribution information corresponding to the feature words cannot be acquired, the acquisition control unit 120 acquires the probability distribution information in the record with the ID "0". By this method, the information processing device 100 is capable of calculating the similarity levels even when the probability distribution information corresponding to the feature words cannot be acquired as will be described later.

Here, the probability distribution information in the record with the ID "3" will be explained below. The "gamma" indicated by the probability distribution information represents gamma distribution. The information "k=2, $\theta=2$" represents parameters indicating features of the gamma distribution.

As above, the acquisition control unit 120 acquires the probability distribution information corresponding to the feature words from the probability distribution table 111.

The acquisition control unit 120 acquires a plurality of numerical values (hereinafter referred to as a plurality of target numerical values) corresponding to the feature words. For example, the acquisition control unit 120 acquires the plurality of target numerical values corresponding to the feature words from an external device. Alternatively, for example, the acquisition control unit 120 acquires the plurality of target numerical values corresponding to the feature words from the numerical value table 112. The case where the plurality of target numerical values are acquired from the numerical value table 112 will be described below. First, examples of the numerical value table 112 will be shown below.

FIGS. 6(A) and 6(B) are diagrams showing examples of the numerical value table in the first embodiment. FIGS. 6(A) and 6(B) show examples of the numerical value table 112.

The numerical value tables 112 in FIGS. 6(A) and 6(B) include items of ID and feature words. In the numerical value table 112 in FIG. 6(A), items of body height and body weight are shown as the items of feature words. In the numerical value table 112 in FIG. 6(B), items of sales figure and operating profit are shown as the items of feature words.

For example, when "body height" is included in the feature words, the acquisition control unit 120 acquires a plurality of numerical values existing in the column "body height" of the numerical value table 112 in FIG. 6(A) as the plurality of target numerical values. Further, the acquisition control unit 120 acquires the unit corresponding to the plurality of target numerical values. For example, the acquisition control unit 120 acquires the unit "cm". When the unit corresponding to the plurality of target numerical values and the unit included in the probability distribution information differ from each other, the acquisition control unit 120 converts the plurality of target numerical values in order to equalize the unit corresponding to the plurality of target numerical values to the unit included in the probability distribution information. When making the conversion, the acquisition control unit 120 may make the conversion by using a unit conversion table. Incidentally, illustration of the unit conversion table is left out.

Further, when the unit included in the feature words and the unit included in the probability distribution information differ from each other, the acquisition control unit 120 converts the input value in order to equalize the unit included in the feature words to the unit included in the probability distribution information.

As above, the information processing device 100 is capable of avoiding states with different units by making the conversion.

Incidentally, there are cases where the input value or a target numerical value indicates a range. In such cases where the input value or a target numerical value indicates a range, the following process may be executed. For example, the input value is assumed to be "165-175". Further, the probability distribution information is assumed to be "normal, $\mu=170$, $\sigma=10$, unit=cm". Probability distribution $P(x)$ being "normal" is represented by expression (1).

$$P(x) = \frac{1}{\sqrt{2\pi 10^2}} \exp\left(-\frac{(x-170)^2}{2 \cdot 10^2}\right) \quad (1)$$

A representative point M of the range is represented by expression (2).

$$M = \int_{165}^{175} x \times P(x) dx = 170 \quad (2)$$

When the representative point M is calculated as above, the representative point M is handled as the input value or the target numerical value. In the above-described example, 170 as the representative point M of "165-175" is handled as the input value. In other words, in the process in the information processing device 100, the input value "165-175" is handled as being the input value "170". Further, the method of determining the representative point M is not limited to the above-described method. For example, the representative point M can be a minimum value or a maximum value of the range.

Returning to FIG. 2, the calculation unit 130 will be described below.

Based on the input value, the probability distribution information and the plurality of target numerical values, the calculation unit 130 calculates a plurality of similarity levels each being the level of similarity between the input value and each of the plurality of target numerical values. Specifically, the calculation unit 130 calculates the plurality of similarity levels with reference to the input value based on the input value, the probability distribution information and the plurality of target numerical values. The method of calculating the plurality of similarity levels will be described in detail below.

First, it is assumed that there exists a probability distribution function of a probability that a stochastic variable X being a real number satisfies "X=x". Incidentally, the probability distribution function is referred to also as a probability density function or a probability mass function. The probability distribution function $P(X=x)$ is used in the calculation of the similarity level by using the probability distribution. Further, as the similarity level, the level of similarity between a real number q and a real number t is calculated.

An area $A(q, t)$ between the real number q and the real number t is represented by expression (3) by using a cumulative distribution function $F(y)$ regarding the probability distribution function $P(X=x)$.

$$A(q,t) = |F(q) - F(t)| \quad (3)$$

The area $A(q, t)$ may be regarded as a value calculated by weighting the distance between the real number q and the real number t with the probability. Then, the calculated value may be considered to represent the level of similarity.

The real number q and the real number t can be considered to be more similar to each other with the decrease in the area $A(q, t)$. Therefore, the similarity level $S(q, t)$ as the level of similarity between the real number q and the real number t is represented by expression (4) by using the area $A(q, t)$.

$$S(q,t) = 1 - A(q,t) \quad (4)$$

The calculation of the similarity level will be described specifically below.

The calculation unit 130 determines $F(q)$ and $F(t)$ based on the probability distribution information. For example, the probability distribution information is assumed to be "normal, $\mu=160$, $\sigma=40$, unit=cm". Probability distribution $P(x)$ being "normal" is represented by expression (5).

$$P(x) = \frac{1}{\sqrt{2\pi 40^2}} \exp\left(-\frac{(x-160)^2}{2 \cdot 40^2}\right) \quad (5)$$

The calculation unit 130 determines $F(q)$ and $F(t)$ based on the probability distribution $P(x)$ represented by the expression (5) and the cumulative distribution function $F(y)$. Then, the calculation unit 130 calculates the similarity level as the level of similarity between the input value and the target numerical value by using the expression (3) and the expression (4). Incidentally, in the calculation of the similarity level, the real number q is set at the input value. The real number t is set at the target numerical value.

The calculation unit 130 calculates the similarity level in regard to each target numerical value by executing the above-described process. For example, in the case of FIG. 7, the calculation unit 130 calculates the similarity level as the level of similarity between the input value "175" and the target numerical value "168" by using the expression (3) and the expression (4). Subsequently, the calculation unit 130 calculates the similarity level as the level of similarity between the input value "175" and the target numerical value "175" by using the expression (3) and the expression (4). As above, the calculation unit 130 calculates the similarity level in regard to each target numerical value by executing the above-described process. Accordingly, the plurality of similarity levels are calculated.

Here, expression (6) may be used instead of the expression (3). Incidentally, t in the expression (6) is set at the target numerical value. Incidentally, q in the expression (6) is set at the input value.

$$A(q,t) = |\int_q^t -\log P(x)| \quad (6)$$

Further, when the expression (6) is used, expression (7) may be used instead of the expression (4).

$$S(q,t) = 1 - (A(q,t))^2 \quad (7)$$

As above, the calculation unit 130 may calculate the plurality of similarity levels by using the expression (6) and the expression (7).

The calculation unit 130 sorts the plurality of similarity levels in descending order.

The output unit 140 outputs information indicating a correspondence relationship among the feature word, the plurality of target numerical values and the plurality of similarity levels. For example, the output unit 140 outputs the information to a display. Alternatively, for example, the output unit 140 outputs the information to another device. Here, the information is referred to as a similarity level list.

Next, a concrete example of a process executed by the information processing device 100 will be described below.

Figure 7:
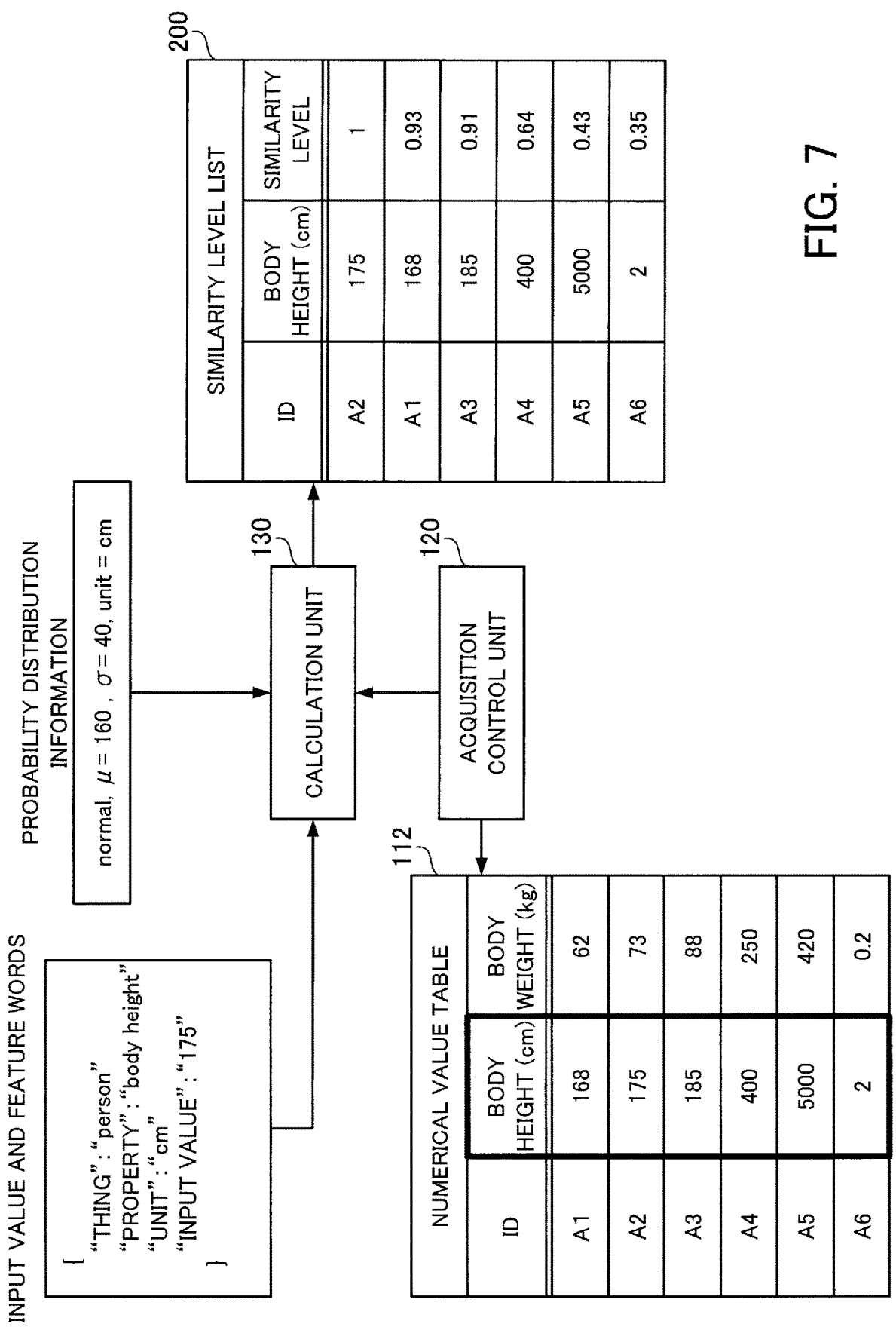
FIG. 7 is a diagram showing a concrete example of a process executed by the information processing device 100 in the first embodiment.

FIG. 7 is a diagram showing a concrete example of the process executed by the information processing device 100 in the first embodiment.

The acquisition control unit 120 acquires the input value "175" and the feature words "person", "body height" and "cm". The acquisition control unit 120 acquires the probability distribution information corresponding to the feature words from the probability distribution table 111. The acquired probability distribution information is "normal, μ=160, σ=40, unit=cm".

The acquisition control unit 120 acquires the plurality of target numerical values corresponding to the feature word "body height" from the numerical value table 112. In short, the acquisition control unit 120 acquires the plurality of numerical values existing in the column "body height" of the numerical value table 112 as the plurality of target numerical values.

Incidentally, since the unit "cm" of the plurality of target numerical values and the unit "cm" included in the probability distribution information are the same as each other, the conversion is not made. Further, since the unit "cm" included in the feature words and the unit "cm" included in the probability distribution information are the same as each other, the conversion is not made.

The calculation unit 130 calculates the plurality of similarity levels each being the level of similarity between the input value and each of the plurality of target numerical values based on the input value, the probability distribution information and the plurality of target numerical values. The calculation unit 130 sorts the plurality of similarity levels in descending order. By this, a similarity level list 200 is generated. The similarity level list 200 indicates the correspondence relationship among the feature word "body height", the plurality of target numerical values and the plurality of similarity levels. The output unit 140 outputs the similarity level list 200.

Next, the process executed by the information processing device 100 will be described below by using a flowchart.

Figure 8:
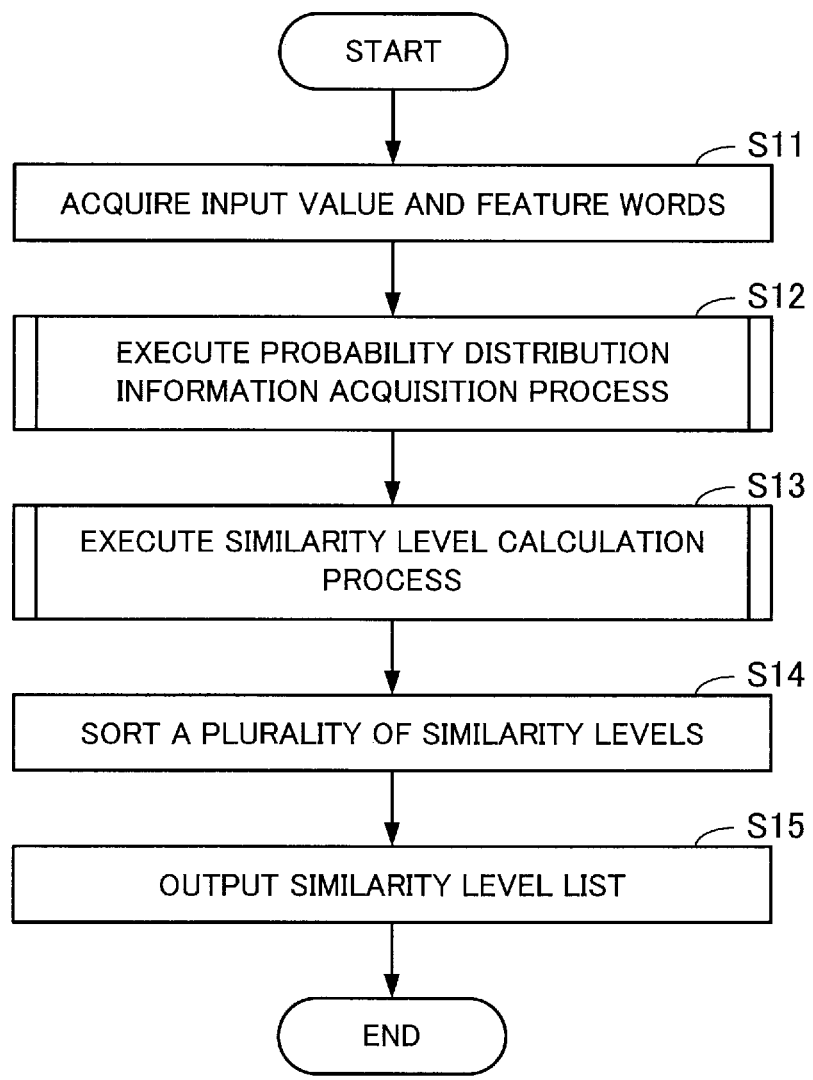
FIG. 8 is a flowchart showing an example of the process executed by the information processing device in the first embodiment.

FIG. 8 is a flowchart showing an example of the process executed by the information processing device in the first embodiment.

(Step S11) The acquisition control unit 120 acquires the input value and the feature words.

(Step S12) The acquisition control unit 120 executes the probability distribution information acquisition process.

(Step S13) The calculation unit 130 executes a similarity level calculation process.

(Step S14) The calculation unit 130 sorts the plurality of similarity levels.

(Step S15) The output unit 140 outputs the similarity level list 200.

Figure 9:
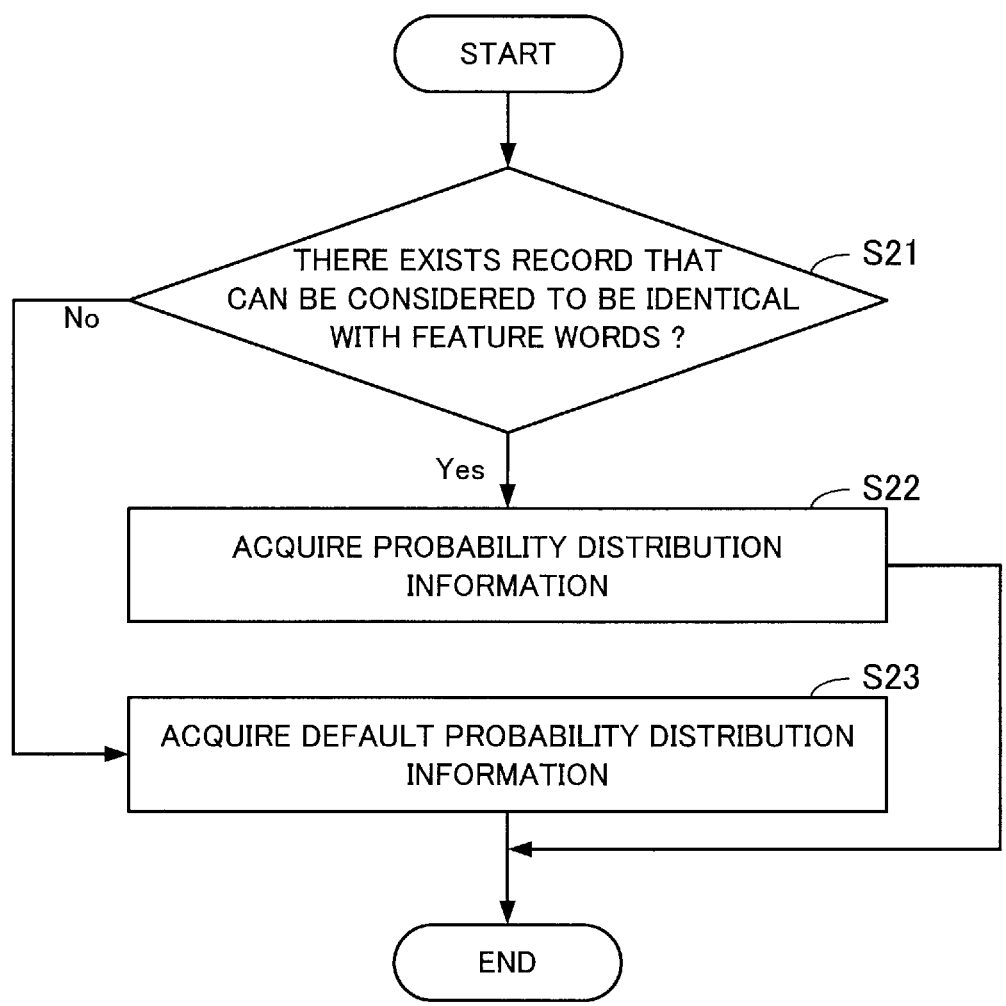
FIG. 9 is a flowchart showing an example of an acquisition process of the probability distribution information in the first embodiment.

FIG. 9 is a flowchart showing an example of an acquisition process of the probability distribution information in the first embodiment. The process of FIG. 9 corresponds to the step S12.

(Step S21) The acquisition control unit 120 judges whether or not there exists a record that can be considered to be identical with the feature words in the probability distribution table 111. If there exists a record that can be considered to be identical with the feature words, the process advances to step S22. If there exists no record that can be considered to be identical with the feature words, the process advances to step S23.

(Step S22) The acquisition control unit 120 acquires the probability distribution information from the record that can be considered to be identical with the feature words.

(Step S23) The acquisition control unit 120 acquires the probability distribution information from the record with the ID "0". In the case where the default probability distribution information is acquired, the default probability distribution information is used in the calculation of the similarity level.

Figure 10:
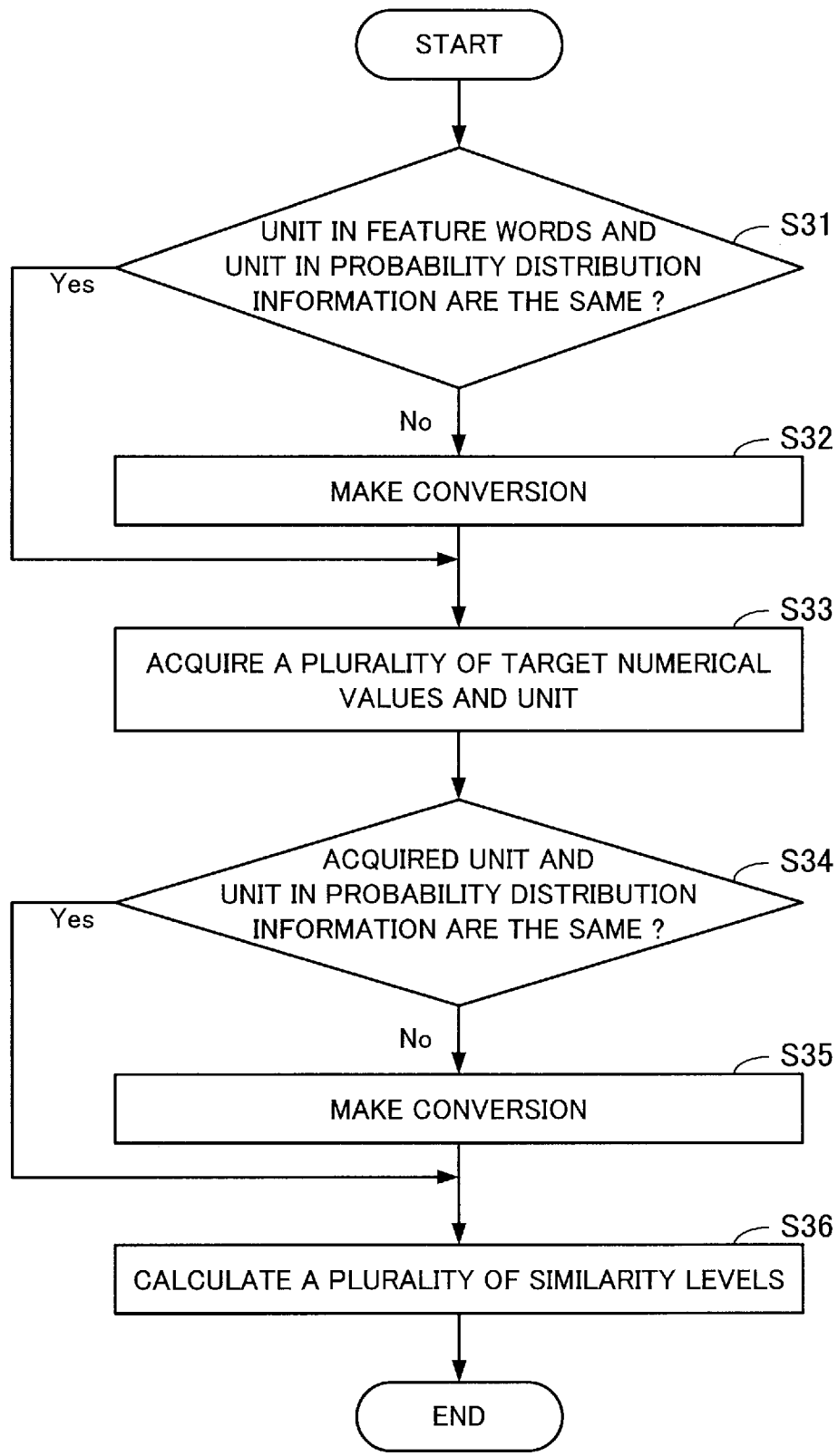
FIG. 10 is a flowchart showing an example of a calculation process of a similarity level in the first embodiment.

FIG. 10 is a flowchart showing an example of a calculation process of the similarity level in the first embodiment. The process of FIG. 10 corresponds to the step S13.

(Step S31) The acquisition control unit 120 judges whether or not the unit included in the feature words and the unit included in the probability distribution information are the same as each other. If the units differ from each other, the process advances to step S32. If the units are the same as each other, the process advances to step S33.

(Step S32) The acquisition control unit 120 converts the input value in order to equalize the unit included in the feature words to the unit included in the probability distribution information.

(Step S33) The acquisition control unit 120 acquires the plurality of target numerical values corresponding to the feature word. Further, the acquisition control unit 120 acquires the unit corresponding to the plurality of target numerical values.

(Step S34) The acquisition control unit 120 judges whether or not the unit acquired in the step S33 and the unit included in the probability distribution information are the same as each other. If the units differ from each other, the process advances to step S35. If the units are the same as each other, the process advances to step S36.

(Step S35) The acquisition control unit 120 converts the plurality of target numerical values in order to equalize the unit acquired in the step S33 to the unit included in the probability distribution information.

(Step S36) The calculation unit 130 calculates the plurality of similarity levels each being the level of similarity between the input value and each of the plurality of target numerical values based on the input value, the probability distribution information and the plurality of target numerical values.

Incidentally, the steps S31 and S32 and the steps S33 to S35 may also be executed in parallel.

Incidentally, there are cases where it is desirable to acquire relevant information that is relevant to a character string (e.g., sentence) including a numerical value. For example, it is possible to consider a method of acquiring the relevant information by using a numerical range including the numerical value. However, there is a problem in that it is unclear which ones out of a plurality of pieces of information acquired by the method are the relevant information actually relevant to the character string.

According to the first embodiment, the information processing device 100 calculates the plurality of similarity levels each being the level of similarity between the input value and each of the plurality of target numerical values. The information processing device 100 is capable of identifying the relevant information relevant to the input value and the feature word based on the plurality of similarity levels. For example, when the similarity level list 200 has been generated as shown in FIG. 7, the information processing device 100 identifies information corresponding to similarity levels higher than or equal to a predetermined threshold value (e.g., 0.9) among the plurality of similarity levels, as the relevant information. By this method, the information processing device 100 is capable of identifying the relevant information (e.g., the records with the IDs A1 to A3) that is relevant to the input value "175" and the feature word "body height".

Further, the information processing device 100 outputs the similarity level list 200 to the display, for example. Accordingly, the user can identify the relevant information relevant to the input value and the feature word by viewing the display.

Incidentally, the feature words have been described as being "thing", "property" and "unit". However, the feature words are not limited to these words. For example, one of "thing", "property" and "unit" may be deleted from the feature words. Further, a new word may be added to the feature words, for example.

The case where the probability distribution information is included in the probability distribution table 111 was described with reference to FIG. 4. However, the probability distribution information may also be called up when a process of a program is being executed. An expression (formula) of the probability distribution indicated by the probability distribution information may be described in a program. Further, the probability distribution information included in the probability distribution table 111 may also be information obtained by fitting by means of multiple regression analysis or the like.

Furthermore, the probability distribution table 111 has been described to include a record that has been set as default. The probability distribution information included in the record may be modified by the user.

Second Embodiment

Next, a second embodiment will be described below. In the second embodiment, the description will be given mainly of features different from those in the first embodiment. In the second embodiment, the description is omitted for features in common with the first embodiment.

FIG. 11 is a block diagram showing functions of an information processing device in the second embodiment. Each component in FIG. 11 that is the same as a component shown in FIG. 2 is assigned the same reference character as in FIG. 2. The information processing device 100 further includes an analysis unit 150.

Part or the whole of the analysis unit 150 may be implemented by a processing circuitry. Part or the whole of the analysis unit 150 may be implemented as modules of a program executed by the processor 101. The function of the analysis unit 150 will be described later.

The storage unit 110 stores a sentence table 113. An example of the sentence table 113 will be shown below.

FIG. 12 is a diagram showing an example of the sentence table in the second embodiment. The sentence table 113 is referred to also as sentence information. The sentence table 113 includes items of ID, sentence and numerical information. The item of sentence indicates a sentence. The item of numerical information indicates a numerical value and feature words included in the sentence. Here, a plurality of sentences registered in the item of sentence are referred to also as a plurality of target sentences.

As above, the sentence table 113 indicates correspondence relationship between a plurality of target sentences and a plurality of numerical values.

The acquisition control unit 120 acquires a sentence (i.e., input data) including a numerical value (i.e., input value) and feature words and numerical information corresponding to the sentence. An example of the acquisition process will be shown below.

Figure 13:
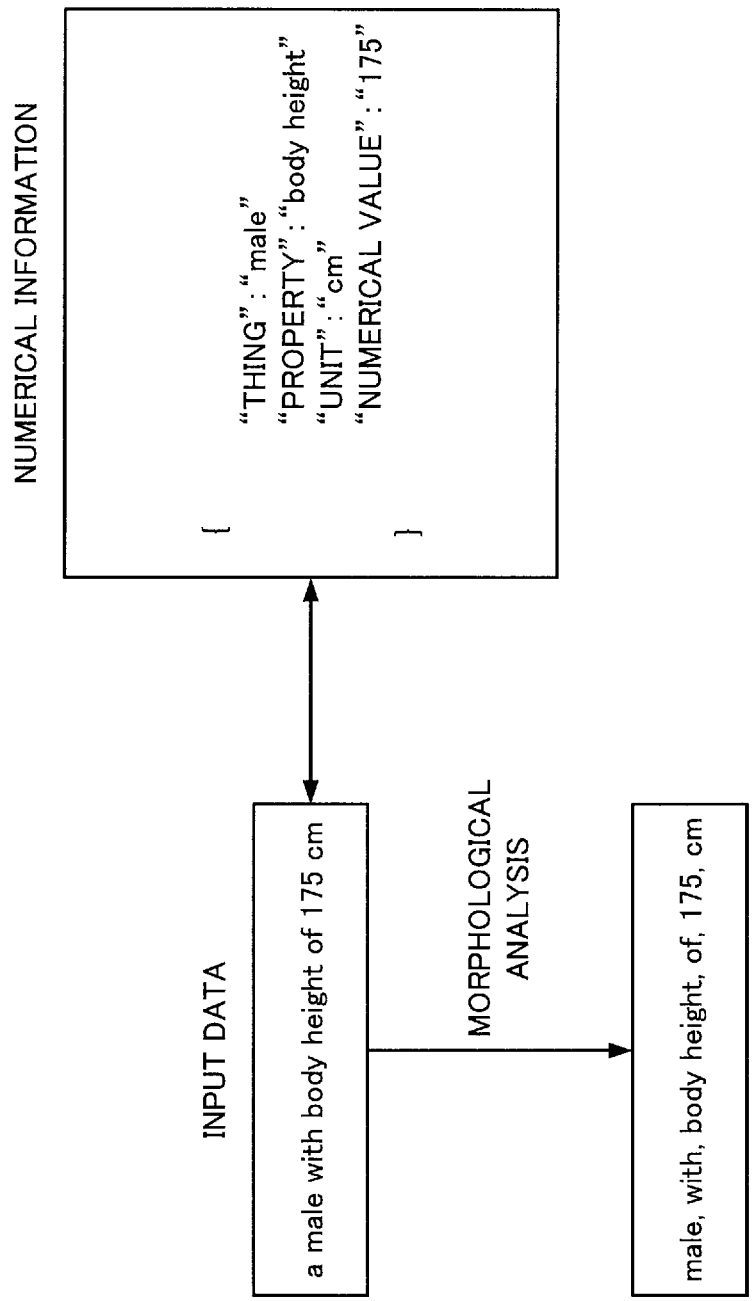
FIG. 13 is a diagram showing an example of an acquisition process in the second embodiment.

FIG. 13 is a diagram showing an example of the acquisition process in the second embodiment. The acquisition control unit 120 acquires a sentence "a male with body height of 175 cm" as the input data and the numerical information. The analysis unit 150 performs morphological analysis on the sentence. By the analysis, "male, with, body height, of, 175, cm" is obtained.

Further, there are cases where the acquisition control unit 120 acquires only the input data. In such cases, the analysis unit 150 performs the morphological analysis on the sentence being the input data. The analysis unit 150 extracts the numerical information based on information obtained by the morphological analysis.

The acquisition control unit 120 acquires the probability distribution information corresponding to the feature words. For example, the acquisition control unit 120 acquires the probability distribution information corresponding to the feature words from the probability distribution table 111.

The calculation unit 130 calculates a plurality of similarity levels each being the level of similarity between the sentence being the input data and each of the plurality of target sentences included in the sentence table 113. The calculation unit 130 is capable of calculating the plurality of similarity levels by using a publicly known technique. For example, the calculation unit 130 is capable of calculating the plurality of similarity levels by using information obtained by morphological analysis. Further, the calculation unit 130 is capable of calculating the plurality of similarity levels by using inter-word similarity levels based on distributed representations of words.

By this process, the plurality of similarity levels corresponding to the plurality of target sentences are calculated. The plurality of similarity levels are referred to also as a plurality of first similarity levels.

The calculation unit 130 complements each part being "unknown" in the numerical information in the sentence table 113 with numerical information acquired by the acquisition control unit 120. For example, in the record with the ID "C1", "THING" and "PROPERTY" have been "unknown". The calculation unit 130 complements "THING" with "male". The calculation unit 130 complements "PROPERTY" with "body height". By this complementing, "unknown" disappears from the numerical information in the sentence table 113.

Based on the acquired probability distribution information, the input value, and the plurality of numerical values included in the sentence table 113 (i.e., the plurality of numerical values existing in the column of numerical information), the calculation unit 130 calculates a plurality of similarity levels each being the level of similarity between the input value and each of the plurality of numerical values. For example, the calculation unit 130 calculates the plurality of similarity levels by using the expression (3) and the expression (4).

By this, the plurality of similarity levels corresponding to a plurality of pieces of numerical information (specifically, the plurality of numerical values in the plurality of pieces of numerical information) are calculated. Incidentally, the plurality of similarity levels are referred to also as a plurality of second similarity levels.

The calculation unit 130 sums up the similarity levels in regard to each combination of a target sentence and numerical information included in the sentence table 113 based on the plurality of first similarity levels and the plurality of second similarity levels. In other words, the calculation unit 130 sums up the similarity levels in regard to each record. For example, the calculation unit 130 sums up the similarity level corresponding to the sentence (specifically, target sentence) with the ID "C1" and the similarity level corresponding to the numerical information (specifically, numerical value) with the ID "C1". Similarly, the calculation unit 130 sums up the similarity levels in regard to each record.

The output unit 140 outputs information indicating correspondence relationship between the combinations of a target sentence and numerical information and the sums. It is also possible for the output unit 140 to output information indicating correspondence relationship between the combinations of a target sentence and a numerical value and the sums.

Next, a process executed by the information processing device 100 will be described below by using a flowchart.

Figure 14:
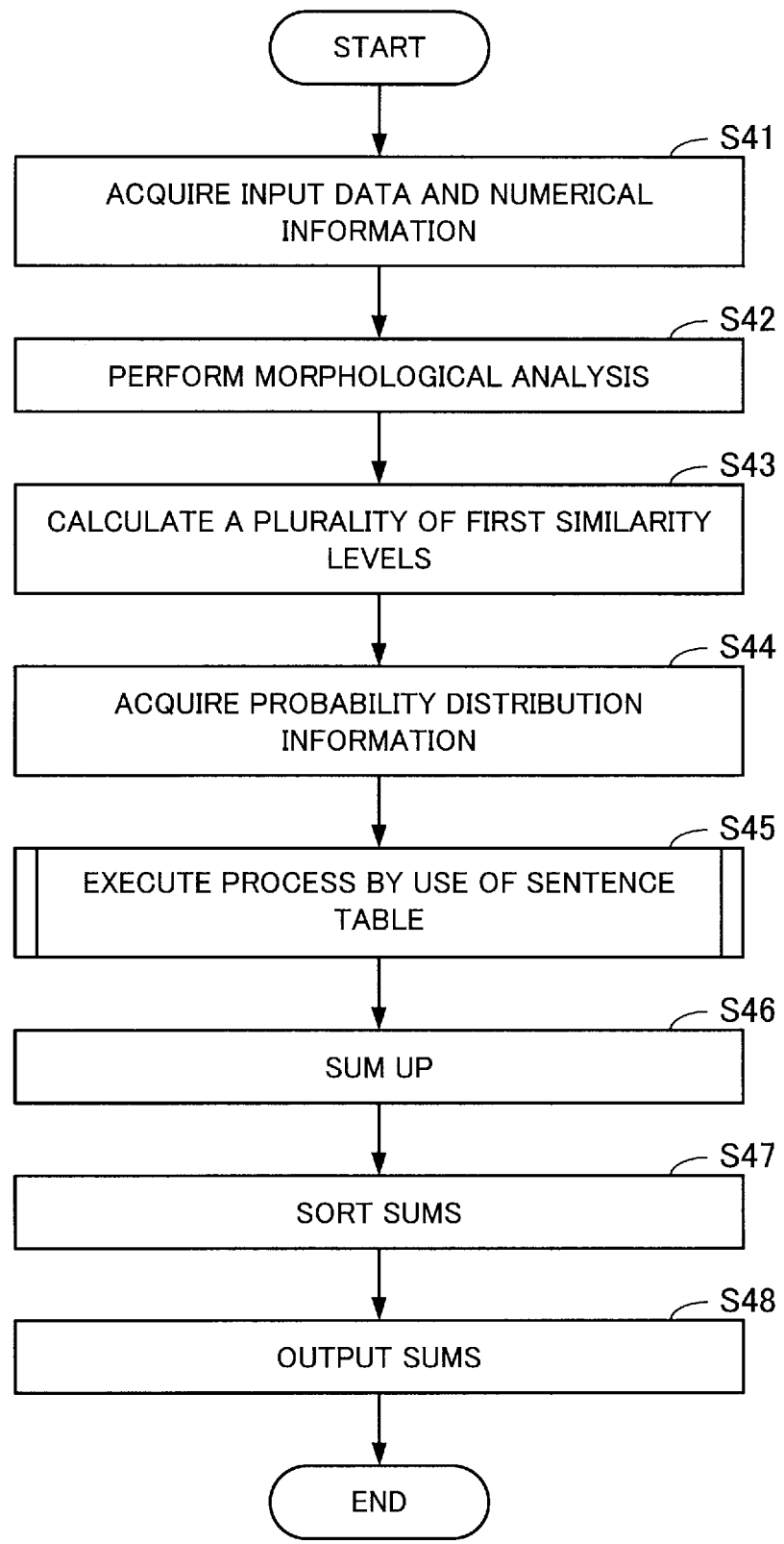
FIG. 14 is a flowchart showing an example of a process executed by the information processing device in the second embodiment.

FIG. 14 is a flowchart showing an example of the process executed by the information processing device in the second embodiment.

(Step S41) The acquisition control unit 120 acquires a sentence (i.e., input data) including a numerical value and feature words and numerical information corresponding to the sentence.

(Step S42) The analysis unit 150 performs morphological analysis on the sentence.

(Step S43) The calculation unit 130 calculates the plurality of first similarity levels each being the level of similarity between the sentence being the input data and each of the plurality of target sentences registered in the sentence table 113.

(Step S44) The acquisition control unit 120 acquires the probability distribution information corresponding to the feature words from the probability distribution table 111.

(Step S45) The calculation unit 130 executes a process by use of the sentence table 113.

(Step S46) The calculation unit 130 sums up the similarity levels in regard to each record.

(Step S47) The calculation unit 130 sorts the sums in descending order.

(Step S48) The output unit 140 outputs the sum in regard to each record.

Incidentally, the step S43 and the steps S44 and S 45 may also be executed in parallel.

Figure 15:
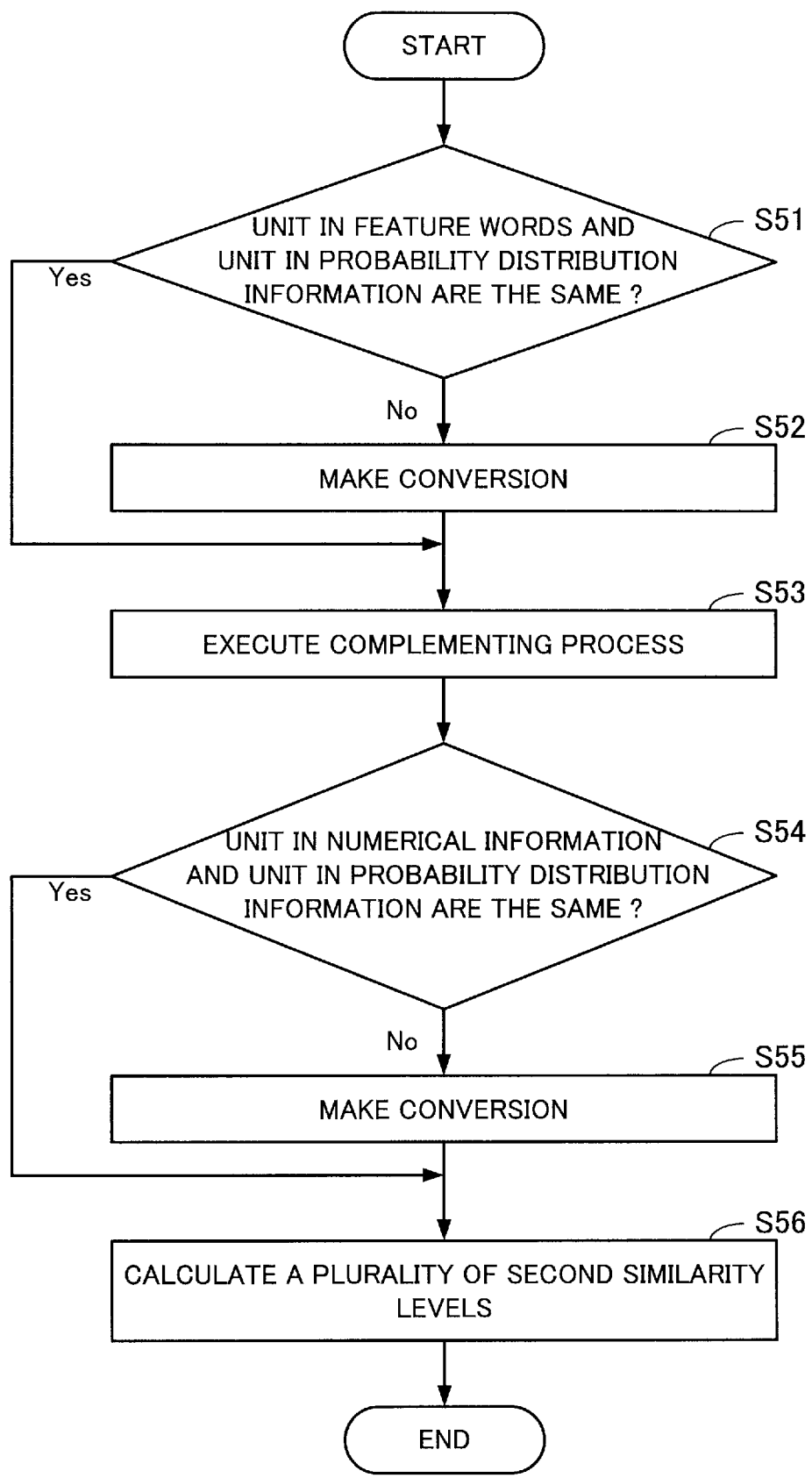
FIG. 15 is a flowchart showing an example of a process by use of the sentence table in the second embodiment.

FIG. 15 is a flowchart showing an example of the process by use of the sentence table in the second embodiment. The process of FIG. 15 corresponds to the step S45.

(Step S51) The acquisition control unit 120 judges whether or not the unit included in the feature words and the unit included in the probability distribution information are the same as each other. If the units differ from each other, the process advances to step S52. If the units are the same as each other, the process advances to step S53.

(Step S52) The acquisition control unit 120 converts the input value in order to equalize the unit included in the feature words to the unit included in the probability distribution information.

(Step S53) The calculation unit 130 complements each part being "unknown" in the numerical information in the sentence table 113 with numerical information acquired by the acquisition control unit 120.

(Step S54) The calculation unit 130 judges whether or not the unit included in the numerical information and the unit included in the probability distribution information are the same as each other. If the units differ from each other, the process advances to step S55. If the units are the same as each other, the process advances to step S56.

(Step S55) The calculation unit 130 converts the numerical value included in the numerical information in order to equalize the unit included in the numerical information to the unit included in the probability distribution information.

Incidentally, the calculation unit 130 does not make the conversion when the type of the unit included in the numerical information and the type of the unit included in the probability distribution information differ from each other. For example, the calculation unit 130 does not make the conversion when the unit included in the numerical information is a unit of weight (e.g., "t") and the unit included in the probability distribution information is a unit of length (e.g., "cm").

(Step S56) The calculation unit 130 calculates the plurality of second similarity levels each being the level of similarity between the input value and each of the plurality of numerical values based on the acquired probability distribution information, the input value, and the plurality of numerical values existing in the column of numerical information.

According to the second embodiment, the information processing device 100 calculates the plurality of first similarity levels. Further, the information processing device 100 calculates the plurality of second similarity levels. The information processing device 100 executes the summation of the similarity levels based on the plurality of first similarity levels and the plurality of second similarity levels. Accordingly, the information processing device 100 is capable of identifying the relevant information relevant to the sentence including the input value and the feature words based on a plurality of sums.

Features in the embodiments described above can be appropriately combined with each other.

DESCRIPTION OF REFERENCE CHARACTERS

100: information processing device, 101: processor, 102: volatile storage device, 103: nonvolatile storage device, 110: storage unit, 111: probability distribution table, 112: numerical value table, 113: sentence table, 120: acquisition control unit, 130: calculation unit, 140: output unit, 150: analysis unit, 200: similarity level list

What is claimed is:

1. An information processing device for receiving as input a natural language query for searching a database, comprising:
acquisition controlling circuitry to
acquire from the input natural language query a numerical value, a particular type of numerical value associated with the acquired numerical value, and a feature word as a word related to the acquired numerical value,
acquire, from a first table correlating probability distributions of particular types of numerical values to respective feature words, information regarding the probability distribution of the acquired particular type of numerical value in relation to the acquired feature word, and
acquire, from a second table correlating records in the database to the numerical values and the particular types of numeral contained in the records, a plurality of target numerical values as a plurality of numerical values associated with the acquired particular type of numerical value, the acquired plurality of target values being associated with different records in the database; and
calculating circuitry to calculate a plurality of similarity levels each being a level of similarity between the acquired numerical value and each record in the database containing one of the plurality of acquired target numerical values based on the acquired numerical value, the acquired probability distribution information and the acquired plurality of target numerical values, retrieving one or more records in the database determined to be most relevant to the natural language query based on the calculated similarity levels, and processing information from the retrieved one or more of records.

2. The information processing device according to claim 1, further comprising outputting circuitry to output information indicating correspondence relationship among the acquired feature word, the acquired plurality of target numerical values and the calculated similarity levels.

3. The information processing device according to claim 1, wherein the acquisition controlling circuitry further converts the acquired numerical value in order to equalize a unit included in the natural language query to a unit included in the acquired probability distribution information when the unit included in natural language query and the unit included in the acquired probability distribution information differ from each other, acquires a unit corresponding to the each of plurality of acquired target numerical values according to the second table, and converts the corresponding target numerical value in order to equalize the acquired unit of the corresponding target numerical values to the unit included in the acquired probability distribution information when the acquired unit of the corresponding target numerical value and the unit included in the acquired probability distribution information differ from each other.

4. The information processing device according to claim 1, further comprising a memory to store the first table, the first table comprising default probability distribution information for probability distribution information that cannot be acquired by the acquisition controlling circuitry based on current contents of the database.

5. An information processing method performed by an information processing device receiving as input a natural language query for searching a database, the information processing method comprising:

acquiring, from the input natural language inquiry, a numerical value, a particular type of numerical value associated with the acquired numerical value, and a feature word as a word related to the acquired numerical value;

acquiring, from a first tale correlating probability distributions of one or more particular types of numerical values to respective feature words, information regarding the probability distribution of the acquired particular type of numerical value in relation to the acquired feature word;

acquiring, from a second table correlating records in the database to the numerical values and the particular types of numeral contained in the records, a plurality of target numerical values as a plurality of numerical values associated with the acquired particular type of numerical value, the acquired plurality of target values being associated with different records in the database;

calculating a plurality of similarity levels each being a level of similarity between the acquired numerical value and each record in the database containing one of the plurality of acquired target numerical values based on the acquired numerical value, the acquired probability distribution information and the acquired plurality of target numerical values; and retrieving one or more records in the database determined to be most relevant to the natural language query based on the calculated similarity levels, and processing information from the retrieved one or more of the records in the database, which are determined to be the most relevant to the natural language query.

6. An information processing device comprising:

a processor to execute a program; and a memory to store the program which, when executed by the processor, performs processes of, receiving as input a natural language query for searching a database, acquiring, from the input natural language query, a numerical value, a particular type of numerical value associated with the acquired numerical value, and a feature word as a word related to the acquired numerical value, acquiring, from a first tale correlating probability distributions of one or more particular types of numerical values to respective feature words, information regarding the probability distribution of the acquired particular type of numerical value in relation to the acquired feature word, acquiring, from a second table correlating records in the database to the numerical values and the particular types of numeral contained in the records, a plurality of target numerical values as a plurality of numerical values associated with the acquired particular type of numerical value, the acquired plurality of target values being associated with different records in the database, calculating a plurality of similarity levels each being a level of similarity between the acquired numerical value and each record in the database containing one of the plurality of acquired target numerical values based on the acquired numerical value, the acquired probability distribution information and the acquired plurality of target numerical values, and retrieving one or more records in the database determined to be most relevant to the natural language query based on the calculated similarity levels, and processing information from the retrieved one or more of the records in the database.

\* \* \* \* \*